United States Patent
Sahoo et al.

(10) Patent No.: US 11,960,137 B2
(45) Date of Patent: Apr. 16, 2024

(54) INTERMITTENTLY BONDED OPTICAL FIBRE RIBBON

(71) Applicant: Sterlite Technologies Limited, Aurangabad (IN)

(72) Inventors: Kishore Sahoo, Aurangabad (IN); Sravan Kumar, Aurangabad (IN); Atul Mishra, Aurangabad (IN); Vikas Shukla, Aurangabad (IN); Neha Thakur, Aurangabad (IN)

( * ) Notice: Subject to any disclaimer, the term of this patent is extended or adjusted under 35 U.S.C. 154(b) by 72 days.

(21) Appl. No.: 16/802,928

(22) Filed: Feb. 27, 2020

(65) Prior Publication Data

US 2021/0018705 A1    Jan. 21, 2021

(30) Foreign Application Priority Data

Jul. 16, 2019 (IN) .............................. 201921028499

(51) Int. Cl.
*G02B 6/44* (2006.01)
*C03C 27/10* (2006.01)

(52) U.S. Cl.
CPC ............ *G02B 6/448* (2013.01); *G02B 6/447* (2013.01); *G02B 6/4482* (2013.01); *C03C 27/10* (2013.01)

(58) Field of Classification Search
CPC .............................. G02B 6/4403; G02B 6/448
See application file for complete search history.

(56) References Cited

U.S. PATENT DOCUMENTS

| | | | |
|---|---|---|---|
| 10,379,306 B2* | 8/2019 | Bringuier | G02B 6/36 |
| 10,585,255 B2* | 3/2020 | Sato | G02B 6/448 |
| 2015/0234139 A1* | 8/2015 | Cignarale | G02B 6/4403 385/114 |
| 2017/0219792 A1* | 8/2017 | Debban | G02B 6/448 |
| 2020/0174209 A1* | 6/2020 | Weimann | G02B 6/441 |

FOREIGN PATENT DOCUMENTS

JP    2012027131 A  *  2/2012

* cited by examiner

*Primary Examiner* — Omar R Rojas
(74) *Attorney, Agent, or Firm* — Steven R. Fairchild; Michael J. Pennington

(57) ABSTRACT

The method for creating an optical fiber ribbon of the present disclosure includes a first step of arranging a plurality of optical fibers in parallel to each other for creating the optical fiber ribbon. In addition, the method includes a second step of intermittently bonding the plurality of optical fibers partially at specific intervals using a matrix material. Further, intermittent bonding of the plurality of optical fibers is in pattern of text. Furthermore, intermittent bonding of the plurality of optical fibers allows the optical fiber ribbon to bend along preferential axis. Moreover, intermittent bonding of the plurality of optical fibers is in pattern of text.

17 Claims, 6 Drawing Sheets

200

300

400

600

INTERMITTENTLY BONDED OPTICAL FIBRE RIBBON

TECHNICAL FIELD

The present disclosure relates to the field of optical fiber ribbon and, in particular, relates to an intermittently bonded optical fiber ribbon. The present application is based on, and claims priority from an Indian Application Number 201921028499 filed on 16 Jul. 2019, the disclosure of which is hereby incorporated by reference herein.

BACKGROUND

With the advancement of science and technology, various modern technologies are being employed for communication purposes. One of the most important modern communication technologies is optical fiber communication technology. Over the last few years, optical fibers are widely used for communication to meet the increasing demands. The Optical fibers are often bundled together in parallel fashion to form a product known as an optical fiber ribbon. In general, the optical fiber ribbon includes optical fibers that have been encased with a suitable matrix material. Typically, the optical fiber ribbons in the cable provide an advantage of mass fusion splicing which reduces the splicing time. However, this increases overall diameter of the optical fiber cable. Also, large dimensions of the optical fiber ribbons lead to the increase of diameter of the optical fiber cable. Conventionally, the optical fiber cables include multiple optical fibers present inside the buffer tubes in a form of ribbons. The optical fiber cable with a large number of ribbons require multiple buffer tubes. Each of the buffer tubes has a thickness which leads to an increase in the overall diameter of the optical fiber cables.

In light of the foregoing discussion, there exists a need for an optical fiber ribbon and an optical fiber cable which overcomes the above cited drawbacks of conventionally known optical fiber ribbons.

BRIEF SUMMARY OF THE INVENTION

The present disclosure provides a method for creating an optical fiber ribbon. The method includes a first step of arranging a plurality of optical fibers in parallel to each other for creating the optical fiber ribbon. In addition, the method includes a second step of intermittently bonding the plurality of optical fibers partially at specific intervals using a matrix material. Further, intermittent bonding of the plurality of optical fibers is in pattern of text.

A primary object of the present disclosure is to provide an intermittently bonded optical fiber ribbon with lower dimensions.

Another object of the present disclosure is to provide the intermittently bonded optical fiber ribbon that may be easily rolled.

Yet another object of the present disclosure is to provide the intermittently bonded optical fiber ribbon with optical fibers partially bonded at intervals.

Yet another object of the present disclosure is to provide an optical fiber cable of reduced diameter in which the intermittently bonded optical fiber ribbon is installed.

Yet another object of the present disclosure is to provide the intermittently bonded optical fiber ribbon with increased flexibility.

Yet another object of the present disclosure is to provide the optical fiber cable with high fiber density in which the intermittently bonded optical fiber ribbon is installed.

In an embodiment of the present disclosure, the matrix material is colored as per color code.

In an embodiment of the present disclosure, the matrix material is fluorescent matrix material.

In an embodiment of the present disclosure, intermittent bonding of the plurality of optical fibers is intermittent in a plane perpendicular to axis of the optical fiber ribbon.

In an embodiment of the present disclosure, intermittent bonding of the plurality of optical fibers allows the optical fiber ribbon to bend along preferential axis.

In an embodiment of the present disclosure, the matrix material of the optical fiber ribbon is characterized by thickness in range of about 15 micron to 20 micron.

In an embodiment of the present disclosure, the matrix material of the optical fiber ribbon is ultra violet acrylate resin.

In an embodiment of the present disclosure, the method includes binding a plurality of optical fiber ribbons with a polyester binder. In addition, the polyester binder is helically rotated over the plurality of optical fiber ribbons for grouping the plurality of optical fiber ribbons without using a buffer tube. Further, each of the plurality of optical fiber ribbons corresponds to the optical fiber ribbon.

In an embodiment of the present disclosure, the method includes binding the plurality of the optical fiber ribbons with the polyester binder. Each of the plurality of optical fiber ribbons corresponds to the optical fiber ribbon. In addition, the polyester binder is a colored polyester binder.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
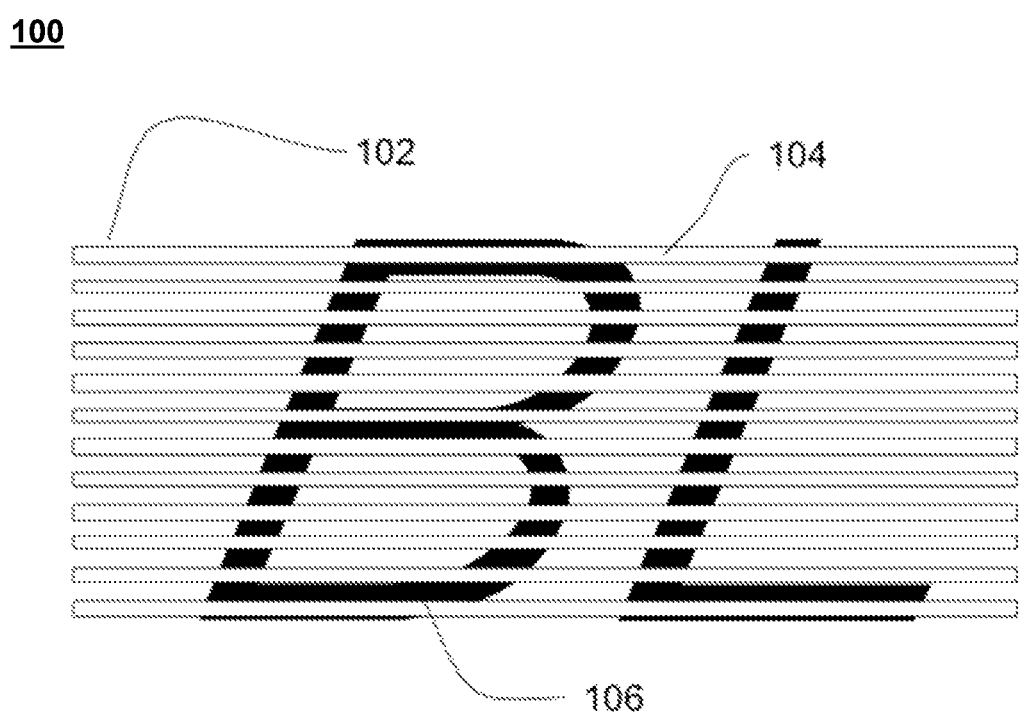
FIG. 1 illustrates a cross sectional view of an optical fiber ribbon, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

REFERENCE NUMERALS IN THE DRAWINGS

For a more complete understanding of the present invention parts, reference is now made to the following descriptions:
100. Cross sectional view.
102. Optical fiber ribbon.
104. Plurality of optical fibers.
106. Matrix material.
500. Polyester binder.
502. Plurality of optical fiber ribbons.
504. One or more water swellable yarns.
600. Optical fiber ribbon cable.
602. Plurality of polyester binders.
604. Jacket.
606. Embedded strength member.
608. Rip cord.

Referring to FIG. 1, this is a cross sectional view 100 of an optical fiber ribbon 102, in accordance with an embodiment of the present disclosure. In general, optical fiber ribbons 102 are made of number of optical fibers bonded together with matrix. In addition, optical fibers are often bundled together in parallel fashion to form optical fiber ribbon. The optical fiber ribbon 102 includes a plurality of optical fibers 104 and a matrix material 106. In general, the optical fiber 104 is a medium associated with transmission of information over long distances in the form of light pulses. In addition, the optical fiber 104 is a type of cabling technology that uses light to transmit voice and data communications over long distances. In an embodiment of the present discourse, number of the plurality of optical fibers 104 in the optical fiber ribbon 102 is 12. In another embodiment of the present disclosure, number of the plurality of optical fibers 104 in the optical fiber ribbon 102 may vary. In an embodiment of the present disclosure, each optical fiber of the plurality of optical fibers 104 has diameter in range of about 180 micron to 220 micron. In another embodiment of the present disclosure, range of diameter of each optical fiber of the plurality of optical fibers 104 may vary.

In an embodiment of the present disclosure, the plurality of optical fibers 104 is intermittently bonded with a colored matrix. In general, intermittent bonding between optical fibers provides high flexibility to the optical fibers. In addition, intermittent bonding of the plurality of optical fibers 104 allows the optical fiber ribbon 102 to bend along preferential axis. Further, bending of the optical fiber ribbon 102 along preferential axis allows easy installation in space constrained regions. In another embodiment of the present disclosure, the plurality of optical fibers 104 is partially bonded with each other at irregular intervals. In yet another embodiment of the present disclosure, the plurality of optical fibers 104 is partially bonded with each other at regular intervals. The plurality of optical fibers 104 is partially bonded with each other using the matrix material 106 forming pattern of text. In general, matrix material provides various handling characteristics to the optical fiber ribbons 102. The various handling characteristics include encapsulation, easy peel and breakout, robustness and the like. In an embodiment of the present disclosure, the matrix material 106 of the optical fiber ribbon 102 is made up of ultraviolet acrylate resin. In another embodiment of the present disclosure, the matrix material 106 of the optical fiber ribbon 102 is made up of any other suitable material of the like.

In an embodiment of the present disclosure, the plurality of optical fibers 104 is partially bonded with each other using the matrix material 106 forming a first pattern of text. The first pattern of text includes one or more alphabets. In an embodiment of the present disclosure, the matrix material 106 forms the first pattern of text "BL". In an embodiment of the present disclosure, the matrix material 106 of the optical fiber ribbon 102 has thickness in range of about 15 micrometer to 20 micrometer. In another embodiment of the present disclosure, thickness of the matrix material 106 of the optical fiber ribbon 102 may vary. In an embodiment of the present disclosure, distance between the two consecutive first patterns of text "BL" in the optical fiber ribbon 102 is in range of about 50 millimeter to 200 millimeter. In another embodiment of the present disclosure, distance between the two consecutive first patterns of text "BL" in the optical fiber ribbon 104 may vary. In an embodiment of the present disclosure, distance between each alphabet of the one or more alphabets in the first pattern of text is in range of about 5 millimeter to 10 millimeter. In another embodiment of the present disclosure, distance between each alphabet of the one or more alphabets in the first pattern of text may vary. In an embodiment of the present disclosure, width of the matrix material 106 applied between any two consecutive optical fibers of the plurality of optical fibers 104 is in range of about 0.5 millimeter to 10 millimeter. In another embodiment of the present disclosure, width of the matrix material 106 applied between any two consecutive optical fibers of the plurality of optical fibers 104 may vary. Further, the matrix material 106 is a colored fluorescent matrix material. The colored fluorescent matrix material allows easy identification of the optical fiber ribbon 102 even during night time. In an embodiment of the present disclosure, color of the matrix material 106 is blue. In another embodiment of the present disclosure, the matrix material 106 may be of any color.

In an embodiment of the present disclosure, the optical fiber ribbon 102 facilitates mass fusion splicing of the plurality of optical fibers 104. In general, mass fusion splicing technique is used to fuse a number of optical fibers in a single ribbon simultaneously. In general, mass fusion splicing technique can fuse up to 12 fibers in the single ribbon at one time. In an embodiment of the present disclosure, mass fusion splicing technique fuses each of the plurality of optical fibers 104 into the optical fiber ribbon 102 simultaneously. In addition, mass fusion splicing technique reduces time for installation of the optical fiber ribbon 102 in a cable. Further, mass fusion splicing technique reduces installation labor cost. In an embodiment of the present disclosure, mass fusion splicing technique reduces dimensions of the optical fiber ribbon 102. In addition, dimensions of the optical fiber ribbon 102 include but may not be limited to width and height. Further, the optical fiber ribbon 102 is characterized by width and height. In an embodiment of the present disclosure, the optical fiber ribbon 102 has width in range of about 2 millimeter to 3.2 millimeter. In another embodiment of the present disclosure, width of the optical fiber ribbon 102 may vary. In an embodiment of the present disclosure, the optical fiber ribbon 102 has height in range of about 200 micron to 310 micron. In another embodiment of the present disclosure, height of the optical fiber ribbon 102 may vary.

Figure 2:
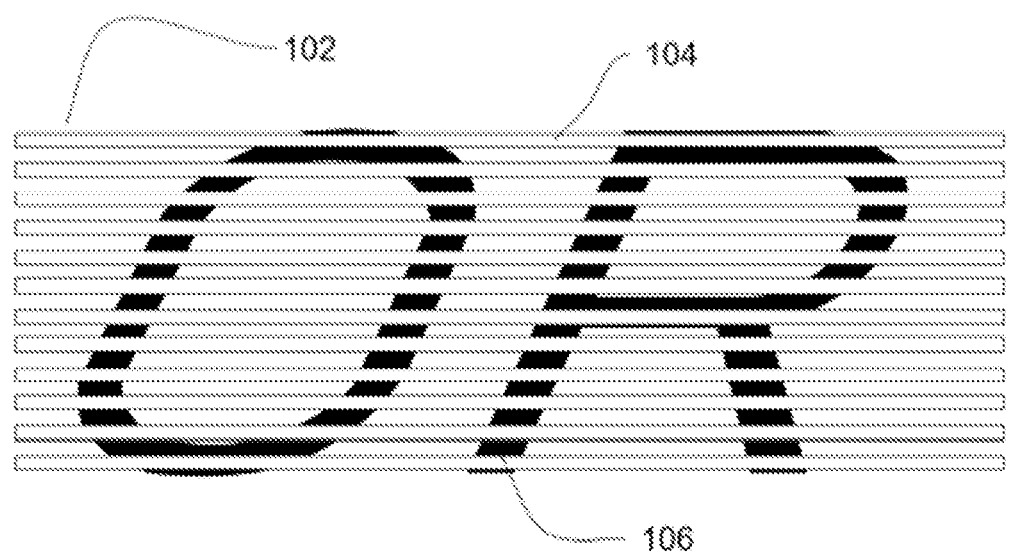
FIG. 2 illustrates a sectional view of the optical fiber ribbon, in accordance with another embodiment of the present disclosure.

Referring to FIG. 2, this is a sectional view 200 of the optical fiber ribbon 102, in accordance with another embodiment of the present disclosure. The optical fiber ribbon 102 includes the plurality of optical fibers 104 and the matrix material 106. In an embodiment of the present disclosure, each optical fiber of the plurality of optical fibers 104 has diameter in range of about 180 microns to 220 microns. In another embodiment of the present disclosure, range of diameter of each optical fiber of the plurality of optical fibers 104 may vary. The plurality of optical fibers 104 is intermittently bonded using the matrix material 106 forming a second pattern of text. The second pattern of text includes the one or more alphabets. In an embodiment of the present disclosure, the matrix material 106 forms the second pattern of text "OR". In an embodiment of the present disclosure, the matrix material 106 of the optical fiber ribbon 102 has thickness in range of about 15 micrometer to 20 micrometer.

In another embodiment of the present disclosure, thickness of the matrix material 106 of the optical fiber ribbon 102 may vary. In an embodiment of the present disclosure, distance between the two consecutive second pattern of text "OR" in the optical fiber ribbon 102 is in range of about 50 millimeter to 200 millimeter. In another embodiment of the present disclosure, distance between the two consecutive second pattern of text "OR" in the optical fiber ribbon 102 may vary. In an embodiment of the present disclosure, distance between each alphabet of the one or more alphabets in the second pattern of text is in range of about 5 millimeter to 10 millimeter. In another embodiment of the present disclosure, range of distance between each alphabet of the one or more alphabets in the second pattern of text may vary. In an embodiment of the present disclosure, width of the matrix material 106 applied between any two consecutive optical fibers of the plurality of optical fibers 104 is in range of about 0.5 millimeter to 10 millimeter. In another embodiment of the present disclosure, width of the matrix material 106 applied between any two consecutive optical fibers of the plurality of optical fibers 104 may vary. Further, the matrix material 106 is the colored fluorescent matrix material. The colored fluorescent matrix material allows easy identification of the optical fiber ribbon 102 even during night time. In an embodiment of the present disclosure, color of the matrix material 106 is orange. In another embodiment of the present disclosure, the matrix material 106 may be of any color.

In an embodiment of the present disclosure, the optical fiber ribbon 102 facilitates mass fusion splicing of the plurality of optical fibers 104. In an embodiment of the present disclosure, mass fusion splicing technique reduces dimensions of the optical fiber ribbon 102. The dimensions of the optical fiber ribbon 102 includes but may not be limited to width and height. In addition, the optical fiber ribbon 102 is characterized by width and height. In an embodiment of the present disclosure, width of the optical fiber ribbon 102 is in range of about 2 millimeter to 3.2 millimeter. In another embodiment of the present disclosure, range of width of the optical fiber ribbon 102 may vary. In an embodiment of the present disclosure, the optical fiber ribbon 102 has height in range of about 200 micron to 310 micron. In another embodiment of the present disclosure, height of the optical fiber ribbon 102 may vary.

Figure 3:
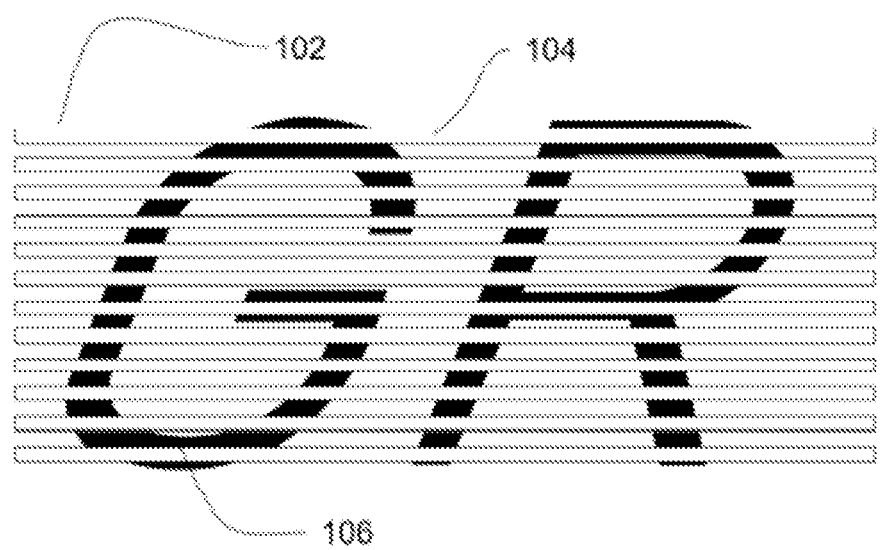
FIG. 3 illustrates an overview of the optical fiber ribbon, in accordance with yet another embodiment of the present disclosure.

Referring to FIG. 3, this is an overview 300 of the optical fiber ribbon 102, in accordance with yet another embodiment of the present disclosure. The optical fiber ribbon 102 includes the plurality of optical fibers 104 and the matrix material 106. In an embodiment of the present disclosure, each optical fiber of the plurality of optical fibers 104 has diameter in range of about 180 micron to 220 micron. In another embodiment of the present disclosure, diameter of each optical fiber of the plurality of optical fibers 104 may vary. The plurality of optical fibers 104 is intermittently bonded using the matrix material 106 forming a third pattern of text. The third pattern of text includes the one or more alphabets. In an embodiment of the present disclosure, the matrix material 106 forms the third pattern of text "GR". The matrix material 106 is the colored fluorescent matrix material. The colored fluorescent matrix material allows easy identification of the optical fiber ribbon 102 even during night time. In an embodiment of the present disclosure, color of the matrix material 106 is green. In another embodiment of the present disclosure, the matrix material 106 may be of any color. In an embodiment of the present disclosure, matrix material 106 of the optical fiber ribbon 102 has thickness in range of about 15 micrometer to 20 micrometer.

In another embodiment of the present disclosure, thickness of the matrix material 106 of the optical fiber ribbon 102 may vary.

In an embodiment of the present disclosure, the optical fiber ribbon 102 facilitates mass fusion splicing of the plurality of optical fibers 104. In an embodiment of the present disclosure, mass fusion splicing technique reduces dimensions of the optical fiber ribbon 102. The dimensions of the optical fiber ribbon 102 includes but may not be limited to width and height. In an embodiment of the present disclosure, width of the optical fiber ribbon 102 is in range of about 2 millimeter to 3.2 millimeter. In another embodiment of the present disclosure, range of width of the optical fiber ribbon 102 may vary. In an embodiment of the present disclosure, distance between the two consecutive third patterns of text "GR" in the optical fiber ribbon 102 is in range of about 50 millimeter to 200 millimeter. In another embodiment of the present disclosure, distance between the two consecutive third patterns of text "GR" in the optical fiber ribbon 106 may vary. In an embodiment of the present disclosure, distance between each alphabet of the one or more alphabets in the third pattern of text is in range of about 5 millimeter to 10 millimeter. In another embodiment of the present disclosure, range of distance between each alphabet of the one or more alphabets in the third pattern of text may vary. In an embodiment of the present disclosure, width of the matrix material 106 applied between any two consecutive optical fibers of the plurality of optical fibers 104 is in range of about 0.5 millimeter to 10 millimeter. In another embodiment of the present disclosure, range of width of the matrix material 106 applied between any two consecutive optical fibers of the plurality of optical fibers 104 may vary. In an embodiment of the present disclosure, the optical fiber ribbon 102 has height in range of about 200 micron to 310 micron. In another embodiment of the present disclosure, range of height of the optical fiber ribbon 102 may vary.

Figure 4:
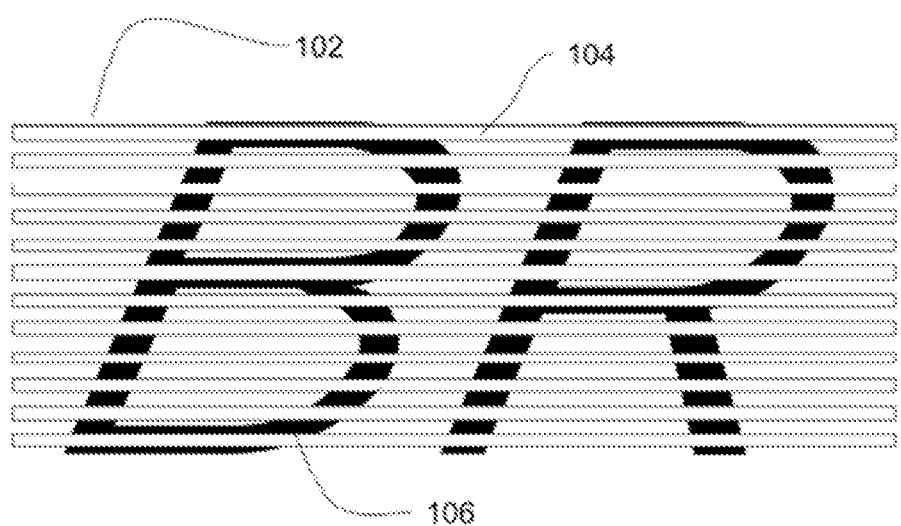
FIG. 4 illustrates a view of the optical fiber ribbon, in accordance with yet another embodiment of the present disclosure.

Referring to FIG. 4, this is a view 400 of the optical fiber ribbon 102, in accordance with yet another embodiment of the present disclosure. The optical fiber ribbon 102 includes the plurality of optical fibers 104 and the matrix material 106. In an embodiment of the present disclosure, each optical fiber of the plurality of optical fibers 104 has diameter in range of about 180 micron to 220 micron. In another embodiment of the present disclosure, diameter of each optical fiber of the plurality of optical fibers 104 may vary. The plurality of optical fibers 104 is intermittently bonded using the matrix material 106 forming a fourth pattern of text. The fourth pattern of text includes the one or more alphabets. The matrix material 106 forms the fourth pattern of text "BR". In an embodiment of the present disclosure, the matrix material 106 of the optical fiber ribbon 102 has thickness in range of about 15 micrometer to 20 micrometer. In another embodiment of the present disclosure, thickness of the matrix material 106 of the optical fiber ribbon 102 may vary. In an embodiment of the present disclosure, distance between the two consecutive fourth patterns of text "BR" in the optical fiber ribbon 102 is in range of about 50 millimeter to 200 millimeter. In another embodiment of the present disclosure, range of distance between the two consecutive fourth patterns of text "BR" in the optical fiber ribbon 102 may vary. In an embodiment of the present disclosure, distance between each alphabet of the one or more alphabets in the fourth pattern of text is in range of about 5 millimeter to 10 millimeter. In another embodiment of the present disclosure, distance between each alphabet of the one or more alphabets in the fourth pattern of text may vary. In an embodiment of the present disclosure, width of the matrix material 106 applied between any two consecutive optical fibers of the plurality of optical fibers 104 is in range of about 0.5 millimeter to 10 millimeter. In another embodiment of the present disclosure, range of width of the matrix material 106 applied between any two consecutive optical fibers of the plurality of optical fibers 104 may vary. Further, the matrix material 106 is the colored fluorescent matrix material. The colored fluorescent matrix material allows easy identification of the optical fiber ribbon 102 even during night time. In an embodiment of the present disclosure, color of the matrix material 106 is brown. In another embodiment of the present disclosure, the matrix material 106 may be of any color.

In an embodiment of the present disclosure, the optical fiber ribbon 102 facilitates mass fusion splicing of the plurality of optical fibers 104. In an embodiment of the present disclosure, mass fusion splicing technique reduces dimensions of the optical fiber ribbon 102. The dimensions of the optical fiber ribbon 102 includes but may not be limited to width and height. In an embodiment of the present disclosure, width of the optical fiber ribbon 102 is in range of about 2 millimeter to 3.2 millimeter. In another embodiment of the present disclosure, range of width of the optical fiber ribbon 102 may vary. In an embodiment of the present disclosure, the optical fiber ribbon 102 has height in range of about 200 micron to 310 micron. In another embodiment of the present disclosure, height of the optical fiber ribbon 102 may vary.

Figure 5:
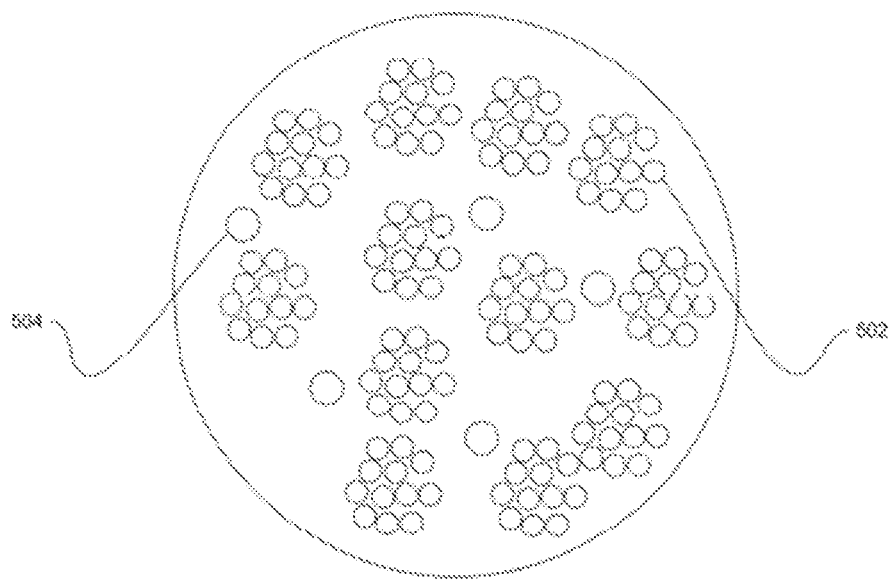
FIG. 5 illustrates a cross-sectional view of a polyester binder, in accordance with an embodiment of the present disclosure.

Referring to FIG. 5, this is a cross-sectional view of a polyester binder 500, in accordance with an embodiment of the present disclosure. The polyester binder 500 includes a plurality of optical fiber ribbons 502 and one or more water swellable yarns 504.

Each of the plurality of optical fiber ribbons 502 corresponds to the optical fiber ribbon 102. In addition, the plurality of optical fiber ribbons 502 is encapsulated in the polyester binder 500. In addition, each of the plurality of optical fiber ribbons 502 is a flexible optical fiber ribbon. Each of the plurality of optical fiber ribbons 502 includes a plurality of optical fibers. In general, an optical fiber is used for transmitting information in the form of light pulses from one end to another. In addition, the optical fiber is a thin strand of glass or plastic capable of transmitting optical signals. Also, the optical fiber is configured to transmit large amount of information over long distances. Also, the optical fiber includes a core region and a cladding region. In an embodiment of the present disclosure, the plurality of optical fibers is arranged in an array in each of the plurality of optical fiber ribbons.

In an embodiment of the present disclosure, the plurality of optical fibers in each of the plurality of optical fiber ribbons 502 corresponds to 12 optical fibers. In another embodiment of the present disclosure, the plurality of optical fibers in each of the plurality of optical fiber ribbons 502 may correspond to any suitable number of optical fibers.

In an embodiment of the present disclosure, each of the plurality of optical fibers is a colored optical fiber. In an example, each of the plurality of optical fibers has same color. In another example, each of the plurality of optical fibers has different color. Further, the plurality of optical fibers is colored to identify each of the plurality of optical fibers. In another example, each of the plurality of optical fibers is not a colored fiber.

In addition, the plurality of optical fiber ribbons 502 facilitates to reduce stresses on the plurality of optical fibers. In an embodiment of the present disclosure, each of the plurality of optical fiber ribbons 502 is a rollable optical fiber ribbon. In general, rolling of each of the plurality of optical fiber ribbons 502 allows it to consume less space in any optical fiber ribbon cable. Further, the plurality of optical fiber ribbons 502 facilitates in efficient mass fusion splicing operations.

The polyester binder 500 includes the one or more water swellable yarns 504. The one or more water swellable yarns 504 are encapsulated in the polyester binder 500. In addition, the one or more water swellable yarns 504 are water blocking yarns. Further, the one or more water swellable yarns 504 inherit water blocking properties to prevent water penetration. In an embodiment of the present disclosure, the one or more water swellable yarns 504 correspond to 5 water swellable yarns. In another embodiment of the present disclosure, the one or more water swellable yarns 504 may correspond to any suitable number of water swellable yarns.

The polyester binder 500 encapsulates the plurality of optical fiber ribbons 502. In addition, the polyester binder 500 encapsulates the one or more water swellable yarns 504. Further, the polyester binder 500 is helically rotated over the plurality of optical fiber ribbons 502. Furthermore, the polyester binder 500 is helically rotated over the one or more water swellable yarns 504. In an embodiment of the present disclosure, the plurality of optical fiber ribbons 502 inside the polyester binder 500 corresponds to 12 optical fiber ribbons. In another embodiment of the present disclosure, the plurality of optical fiber ribbons 502 inside the polyester binder 500 may correspond to any suitable number of optical fiber ribbons.

The polyester binder 500 holds the plurality of optical fiber ribbons 502. In addition, the polyester binder 500 holds the one or more water swellable yarns 504. In an embodiment of the present disclosure, the polyester binder 500 is a colored polyester binder. Further, the polyester binder 500 is colored to identify the plurality of optical fiber ribbons 502. Furthermore, the color of the polyester binder 500 helps in identification of the plurality of optical fiber ribbons during installation and splicing of any optical fiber ribbon cable. In another embodiment of the present disclosure, the color of the polyester binder 500 includes but may not be limited to green, blue, yellow and red. In another embodiment of the present disclosure, the polyester binder 500 is not colored.

Further, it may be noted that in FIG. 5, the polyester binder 500 includes twelve optical fiber ribbons; however, those skilled in the art would appreciate that more or less number of the optical fiber ribbons may be included in the polyester binder 500.

Figure 6:
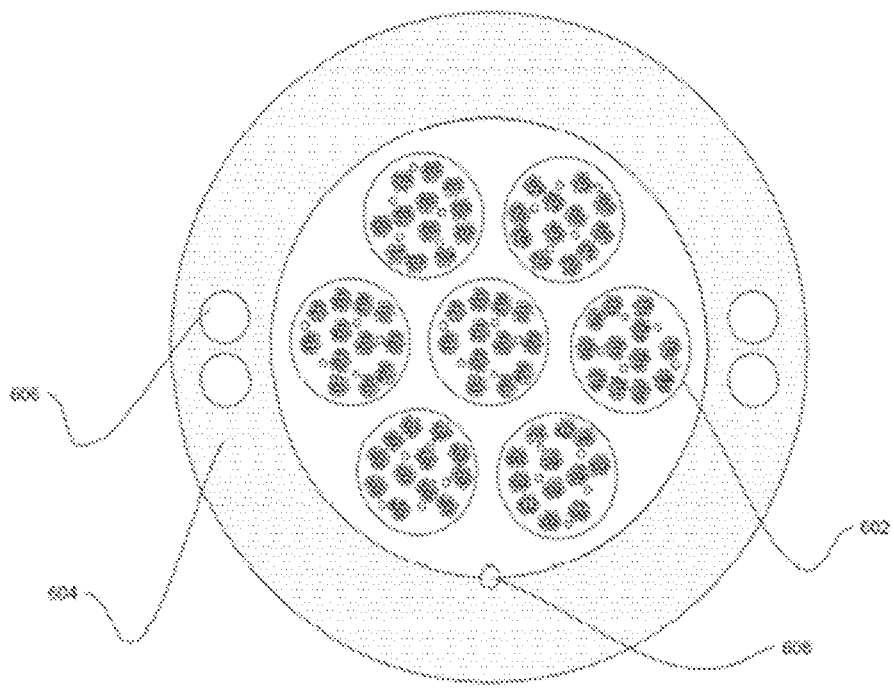
FIG. 6 illustrates a cross-sectional view of an optical fiber ribbon cable 600, in accordance with an embodiment of the present disclosure.

Referring to FIG. 6, this is a cross-sectional view of an optical fiber ribbon cable 600, in accordance with an embodiment of the present disclosure. The optical fiber ribbon cable 600 includes a plurality of polyester binders 602 and a jacket 604.

The plurality of polyester binders 602 is enclosed in the optical fiber ribbon cable 600. In addition, each of the plurality of polyester binders 602 is the polyester binder 500 of FIG. 5. In an embodiment of the present disclosure, the plurality of optical fiber ribbons 502 corresponds to 12 optical fiber ribbons. In another embodiment of the present disclosure, the plurality of optical fiber ribbons may correspond to any suitable number of optical fiber ribbons. In an embodiment of the present disclosure, each of the plurality of polyester binders 602 is colored. In another embodiment of the present disclosure, each of the plurality of polyester binders 602 is not colored. In an example, color of each of the plurality of polyester binders 602 includes but may not be limited to green, blue, yellow and red. In addition, the plurality of polyester binders 602 facilitates in reduction of overall diameter of the optical fiber ribbon cable 600.

The optical fiber ribbon cable 600 includes the jacket 604. The jacket 604 is an outermost layer of the optical fiber ribbon cable 600. In addition, the jacket 604 encapsulates the plurality of polyester binders 602. Further, the jacket 604 provides protection to the optical fiber ribbon cable 600. Furthermore, the jacket 604 provides robustness to the optical fiber ribbon cable 600 for outdoor applications. Moreover, the jacket 604 provides resistance to crush forces and rodent bites.

The optical fiber ribbon cable 600 includes an embedded strength member 606 (i.e. an embedded FRP) to provide tensile strength to the optical fiber ribbon cable 600, and a rip cord 608 to tear/remove the outer sheath to access the buffer tubes.

In an embodiment of the present disclosure, number of the polyester binder 500 in the optical fiber ribbon cable 600 is 7. In another embodiment of the present disclosure, number of the polyester binder 500 in the optical fiber ribbon cable 600 may vary.

Further, it may be noted that in FIG. 6 the optical fiber ribbon cable 600 includes seven number of polyester binders; however, those skilled in the art would appreciate that more or less number of polyester binders is included in the optical fiber ribbon cable 600.

The optical fiber ribbon have numerous advantages over the prior art. The optical fiber ribbon is flexible and easy to deploy in optical fiber cables. In addition, the optical fiber ribbon has small dimensions. Further, small dimensions of the optical fiber ribbon reduces overall diameter of optical fiber cable upon installation. Furthermore, the optical fiber ribbon may have high fiber density. Moreover, the optical fiber ribbon has colored fluorescent matrix material that makes easy to distinguish at night. The polyester binder facilitates in the reduction of diameter of an optical fiber ribbon cable having high fiber count. In addition, the polyester binder facilitates in the reduction of overall weight of the optical fiber ribbon cable. Furthermore, the polyester binder facilitates in easier handling of the optical fiber ribbon cable. Moreover, the polyester binder reduces plastic consumption in the optical fiber ribbon cable.

Although, the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A method of creating an optical fiber ribbon, comprising:

arranging a plurality of optical fibers in parallel to each other for creating the optical fiber ribbon, and intermittently bonding the plurality of optical fibers partially at specific intervals using a matrix material, wherein the matrix material is applied in a space between adjacent optical fibers of the plurality of optical fibers such that the intermittent bonding is in a predefined pattern, wherein the predefined pattern is in a form of text formed by the matrix material applied in the space between adjacent optical fibers of the plurality of optical fibers, wherein the predefined pattern of text includes at least two alphabets such that distance between each alphabet of the at least two alphabets is in a range of 5 millimeter to 10 millimeter, wherein the intermittent bonding of the plurality of optical fibers is used for identification of each ribbon.

2. The method as claimed in claim 1, wherein the intermittent bonding is colored as per color code for the identification of each ribbon.

3. The method as claimed in claim 1, wherein the text is visible from a plane perpendicular to an axis of the optical fiber ribbon.

4. The method as claimed in claim 1, wherein the matrix material is a fluorescent matrix material.

5. The method as claimed in claim 1, wherein the intermittent bonding of the plurality of optical fibers is intermittent in a plane perpendicular to an axis of the optical fiber ribbon.

6. The method as claimed in claim 1, wherein the intermittent bonding of the plurality of optical fibers allows the optical fiber ribbon to bend along a preferential axis.

7. The method as claimed in claim 1, wherein the matrix material of the optical fiber ribbon is characterized by thickness in a range of 15 micron to 20 micron.

8. The method as claimed in claim 1, wherein the matrix material of the optical fiber ribbon is an ultraviolet acrylate resin.

9. The method as claimed in claim 1, further comprising binding a plurality of optical fiber ribbons with a polyester binder, wherein the polyester binder is helically rotated over the plurality of optical fiber ribbons for grouping the plurality of optical fiber ribbons without using a buffer tube, wherein each of the plurality of optical fiber ribbons corresponds to the optical fiber ribbon.

10. The method as claimed in claim 1, further comprising binding a plurality of optical fiber ribbons with a polyester binder, wherein the polyester binder is a colored polyester binder.

11. An optical fiber ribbon, comprising:
a plurality of optical fibers, wherein adjacent fibers of the plurality of optical fibers being intermittently bonded along a length of the plurality of optical fibers, wherein the adjacent fibers of the plurality of optical fibers are intermittently bonded using a matrix material, wherein the matrix material is applied in a space between the adjacent optical fibers of the plurality of optical fibers such that the intermittent bonding is in a predefined pattern, wherein the predefined pattern is in a form of text formed by the matrix material applied in the space between adjacent optical fibers of the plurality of optical fibers, wherein the predefined pattern of text includes at least two alphabets such that distance between each alphabet of the at least two alphabets is in a range of 5 millimeter to 10 millimeter, wherein the intermittent bonds form the predefined pattern on the optical fiber ribbon for identification of each ribbon.

12. The optical fiber ribbon as claimed in claim 11, wherein the matrix material is one or more of colored and fluorescent.

13. The optical fiber ribbon as claimed in claim 11, wherein the matrix material forming the intermittent bond has a thickness in a range of 15 micron to 20 micron.

14. The optical fiber ribbon as claimed in claim 11, wherein the matrix material is ultraviolet acrylate resin.

15. The optical fiber ribbon as claimed in claim 11, wherein the optical fiber ribbon further comprises a plurality of optical fiber ribbons bind with a polyester binder, wherein the polyester binder is helically rotated over the plurality of optical fiber ribbons for grouping the plurality of optical fiber ribbons without using a buffer tube.

16. The optical fiber ribbon as claimed in claim 11, wherein the optical fiber ribbon comprises a plurality of optical fiber ribbons bind with a polyester binder, wherein each of the plurality of optical fiber ribbons corresponds to the optical fiber ribbon, wherein the polyester binder is a colored polyester binder.

17. An optical fiber ribbon, comprising:
a plurality of optical fibers, wherein adjacent fibers of the plurality of optical fibers being intermittently bonded along a length of the plurality of optical fibers, wherein the adjacent fibers of the plurality of optical fibers are intermittently bonded using a matrix material, wherein the matrix material is applied in a space between the adjacent optical fibers of the plurality of optical fibers such that the intermittent bonding is in a predefined pattern, wherein the predefined pattern is in a form of text formed by the matrix material applied in the space between adjacent optical fibers of the plurality of optical fibers, wherein the predefined pattern of text includes at least two alphabets such that distance between each alphabet of the at least two alphabets is in a range of 5 millimeter to 10 millimeter, wherein the intermittent bonds form the predefined pattern on the optical fiber ribbon for identification of each ribbon, wherein the matrix material is one or more of colored and fluorescent.

* * * * *